(12) United States Patent
Takezawa et al.

(10) Patent No.: US 7,349,012 B2
(45) Date of Patent: *Mar. 25, 2008

(54) IMAGING APPARATUS WITH HIGHER AND LOWER RESOLUTION CONVERTERS AND A COMPRESSION UNIT TO COMPRESS DECREASED RESOLUTION IMAGE DATA

(75) Inventors: Masayuki Takezawa, Kanagawa (JP); Yoichi Mizutani, Saitama (JP); Hideki Matsumoto, Kanagawa (JP); Ken Nakajima, Tokyo (JP); Toshihisa Yamamoto, Kanagawa (JP)

(73) Assignee: Sony Corporation, Tokyo (JP)

(*) Notice: Subject to any disclaimer, the term of this patent is extended or adjusted under 35 U.S.C. 154(b) by 763 days.

This patent is subject to a terminal disclaimer.

(21) Appl. No.: 10/650,021

(22) Filed: Aug. 26, 2003

(65) Prior Publication Data
US 2005/0088561 A1    Apr. 28, 2005

Related U.S. Application Data

(63) Continuation of application No. 09/353,287, filed on Jul. 14, 1999, now Pat. No. 6,639,627.

(30) Foreign Application Priority Data

Jul. 17, 1998  (JP) ................................. 10-204088
Nov. 20, 1998  (JP) ................................. 10-331614

(51) Int. Cl.
*H04N 5/228* (2006.01)
(52) U.S. Cl. ............................. 348/222.1; 348/333.01
(58) Field of Classification Search ............ 348/222.1, 348/333.01, 231.99
See application file for complete search history.

(56) References Cited

U.S. PATENT DOCUMENTS

| 5,525,957 | A |   | 6/1996  | Tanaka ............... 348/220.1 |
| 5,734,427 | A | * | 3/1998  | Hayashi ............. 348/333.11 |
| 5,978,020 | A |   | 11/1999 | Watanabe et al. .... 348/207.99 |
| 6,137,534 | A | * | 10/2000 | Anderson ............ 348/222.1 |

(Continued)

FOREIGN PATENT DOCUMENTS

JP          2000 92349         3/2000

(Continued)

*Primary Examiner*—Tuan Ho
(74) *Attorney, Agent, or Firm*—Frommer Lawrence & Haug LLP; William S. Frommer

(57) ABSTRACT

In an imaging apparatus, an image is to be displayed in real-time on a finder. In the finder mode, a CCD interface 21a thins out horizontal components of image data supplied from an image generating unit 10 to one-third and also effects gamma correction etc to send the resulting image data to a camera DSP 21c. The camera DSP 21c effects data conversion and resolution conversion on the image data resulting from the thinning to convert the data into Y, Cb and Cr image data which is routed to a memory controller 22. The memory controller 22 writes the image data in the image memory 32 and reads out the data from the memory controller 22 to route the read-out data over an image data bus 33 to an NTSC/PAL encoder 23. The NTSC/PAL encoder 23 converts the image data in resolution and further converts the image data into data of the NTSC or PAL system to route the resulting data to a finder.

5 Claims, 13 Drawing Sheets

U.S. PATENT DOCUMENTS

| | | | |
|---|---|---|---|
| 6,313,877 B1 | 11/2001 | Anderson | 348/333.05 |
| 6,487,366 B1 * | 11/2002 | Morimoto et al. | 386/117 |
| 6,674,464 B1 | 1/2004 | Mizutani et al. | |
| 6,781,629 B2 * | 8/2004 | Ohnogi | 348/333.01 |
| 2003/0147634 A1 | 8/2003 | Takezawa et al. | |

FOREIGN PATENT DOCUMENTS

| | | |
|---|---|---|
| JP | 2000 92365 | 3/2000 |
| WO | WO 97 24880 | 7/1997 |

* cited by examiner

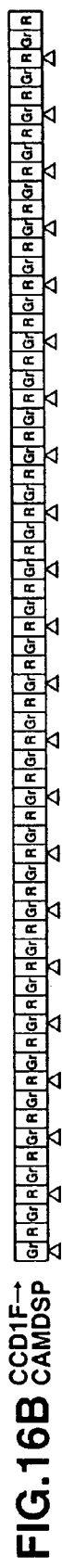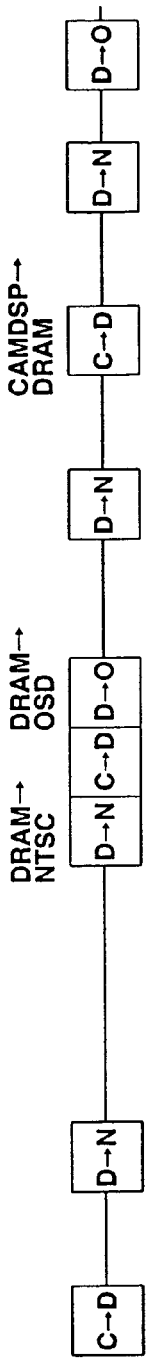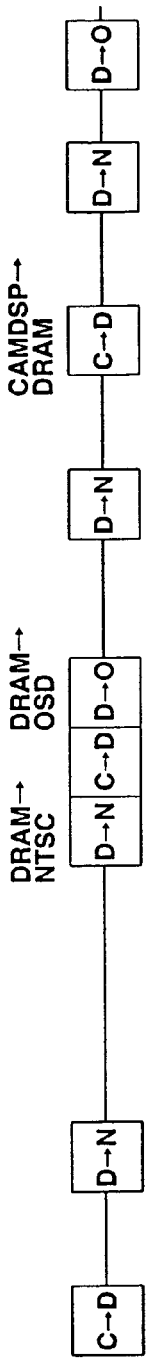

IMAGING APPARATUS WITH HIGHER AND LOWER RESOLUTION CONVERTERS AND A COMPRESSION UNIT TO COMPRESS DECREASED RESOLUTION IMAGE DATA

CROSS-REFERENCE TO RELATED APPLICATIONS

This application is a continuation application of U.S. patent application Ser. No. 09/353,287, filed Jul. 14, 1999 now U.S. Pat. No. 6,639,627.

BACKGROUND OF THE INVENTION

1. Field of the Invention

This invention relates to an imaging apparatus having the function of displaying an image of an object on a finder in real-time.

2. Description of the Related Art

A digital still camera retrieves image data obtained by a CCD image sensor into a DRAM or a flash memory and subsequently transfers the image data to a so-called personal computer or the like. A major proportion of this type of the digital still camera has hitherto been of the type coping with the video graphics array (VGA) system.

Referring to FIG. 1, this digital still camera 200 includes a CCD image sensor 201 for generating image signals, an input processing/image processing circuit 202, a memory controller 203 for reading and writing image data, an output processing circuit 204 for conversion to an output image of a pre-set system, a finder 205 for displaying the state of an object at the time of image shooting, a recording unit 207 for recording compressed image data over a CPU bus 206 and a compression/expansion circuit 208 for compressing/expanding image data. The digital still camera 200 also includes a memory 209, formed by, for example, a DRAM, and a CPU 210 for controlling the overall device.

Before starting the image shooting of an object, the user has to confirm an object image displayed on the finder 205. This state is termed a finder mode. At this time, the CCD image sensor 201 sends image signals obtained on photoelectric conversion of the imaging light from an object to the input processing/image processing circuit 202. The input processing/image processing circuit 202 performs the correlated dual sampling processing on the image signals to digitize the image signals. The input processing/image processing circuit 202 then performs pre-set signal processing, such as gamma correction, knee processing or camera processing and routes the processed image signals to the memory controller 203, which then is responsive to the control by the CPU 210 to send the image data from the input processing/image processing circuit 202 to the output processing circuit 204. The output processing circuit 204 encodes image data in accordance with, for example, the National Television System Committee (NTSC) system, and analogizes the encoded image data to route the resulting analog data to the finder 205. This allows the object as an object of image shooting to be indicated on the finder 205.

On the other hand, if the user pushes a shutter button, not shown, to shift to the recording mode, the memory controller 203 causes the image data furnished from the input processing/image processing circuit 202 to be written in the memory 209. The CPU 210 causes the image data to be read out from the memory 209 and compresses the image data from the recording unit 207 in the compression/expansion circuit 208 in accordance with, for example, the Joint photographic Experts Group (JPEG) system to record the compressed image data in the recording unit 207.

If the user performs pre-set processing to shift to the reproducing mode, the CPU 210 causes image data to be read out from the recording unit 207 to cause the image data to be expanded in JPEG system in the compression/expansion circuit 208 to route the resulting data via memory controller 203 and output processing circuit 204 to the finder 205. This causes the as-shot image to be displayed on the finder 205.

In keeping up with recent outstanding technical progress in the CCD image sensor, the resolution of image data is approximately surpassing 1,000,000 pixels. On the other hand, it may be feared that the digital still camera of the above-described structure cannot sufficiently cope with the image data exceeding 1,000,000 pixels.

If, for example, the CCD image sensor 201 outputs image signals of high resolution in the finder mode, the input processing/image processing circuit 202 has to perform resolution conversion of image data in real-time in meeting with the resolution of the finder 205. Simultaneously, the memory controller 203 has to access the memory 209. The output processing circuit 204 also has to perform pre-set processing.

The result is stagnancy on the CPU bus 106, such that each circuit cannot execute pre-set processing in real-time and hence an image of an object is displayed in a frame-decimated fashion on the finder 205. If, in this case, an object has made movements, there is produced deviation between the actual object and the movement of the object displayed on the finder 105, thus producing an inconvenience in the imaging operation.

On the other hand, if image data is not of high resolution, the resolution of the image data has to be converted into that of, for example, the NTSC system or the PAL system, taking into account the system of the finder 205. In this case, it is similarly required to display an image on a finder in real-time.

SUMMARY OF THE INVENTION

It is therefore an object of the present invention to provide an imaging apparatus in which, even of image data of an image are of high resolution, the image can be displayed in real-time on the finder.

In one aspect, the present invention provides an imaging apparatus including imaging means for generating image data corresponding to the imaging light from an object, first resolution converting means for lowering the resolution of the image data from the imaging means by way of resolution conversion, second resolution conversion means for raising the resolution of the image data supplied from the first resolution conversion means over an image data bus by way of resolution conversion, and outputting means for outputting the image data from the second resolution conversion means on display means.

In another aspect, the present invention provides a recording/reproducing apparatus including imaging means for generating image data corresponding to the imaging light from an object, recording/reproducing means for recording the image data on a recording medium and for reproducing the image data recorded on the recording medium, first resolution conversion means for effecting resolution conversion of lowering the resolution of the image data from the imaging means, second resolution conversion means for effecting resolution conversion of raising the resolution of the image data supplied from the first resolution conversion means over an image data bus, storage means for storing the image data, third resolution conversion means for performing resolution conversion of the image data supplied from the storage means, and display means for displaying an image corresponding to the image data from the second or third resolution conversion means.

According to the imaging apparatus of the present invention, in which, by way of performing resolution conversion, the first resolution conversion means lowers the resolution of the image data from the imaging means, and the second resolution conversion means raises the resolution of the image data supplied from the first resolution conversion means over the image data bus to reduce the proportion of occupation of the image data on the image data bus to enable real-time display of the object image on the display means.

BRIEF DESCRIPTION OF THE DRAWINGS

FIGS. 16A to 16F show a timing chart for illustrating the contents of the signal processing in the respective circuits in the finder mode.

DESCRIPTION OF THE PREFERRED EMBODIMENTS

Figure 1:
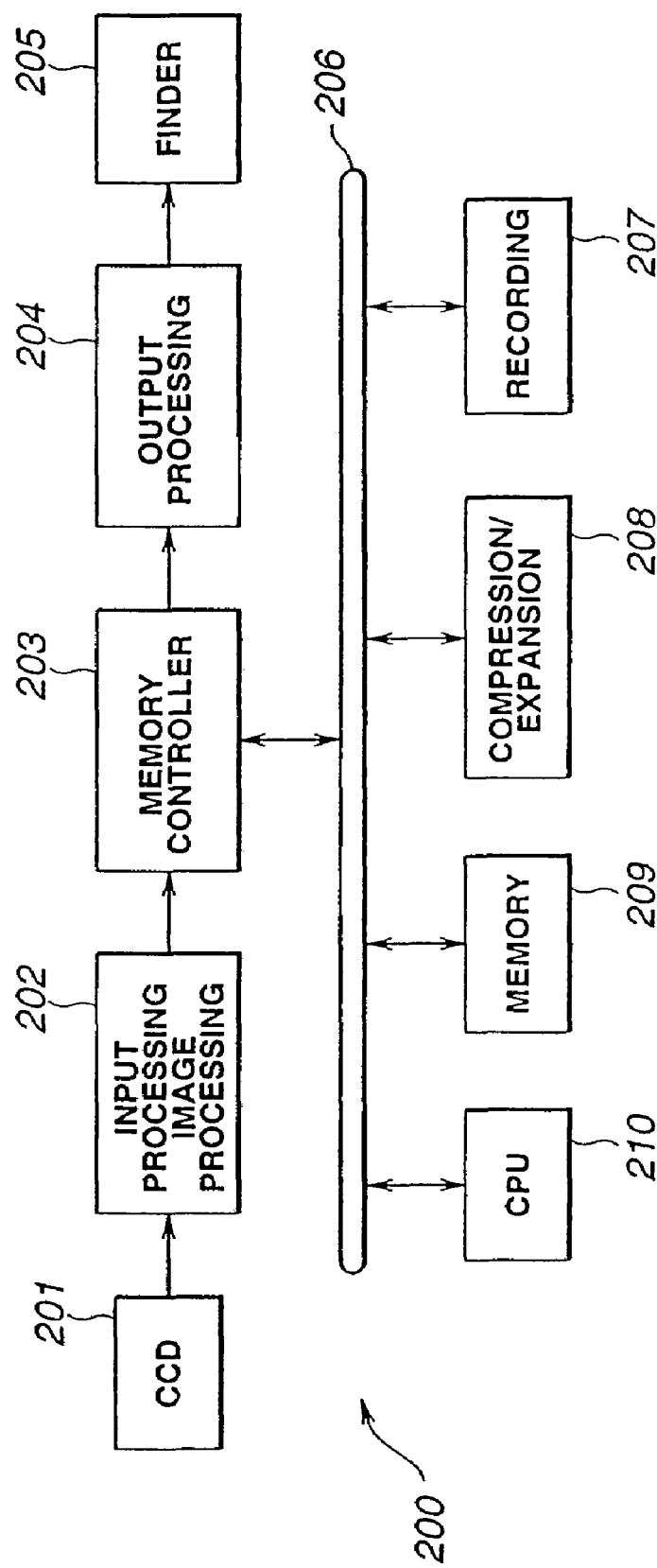
FIG. 1 is a block diagram for illustrating the structure of a conventional digital still camera.

Referring to the drawings, preferred embodiments of the present invention will be explained in detail.

Figure 2:
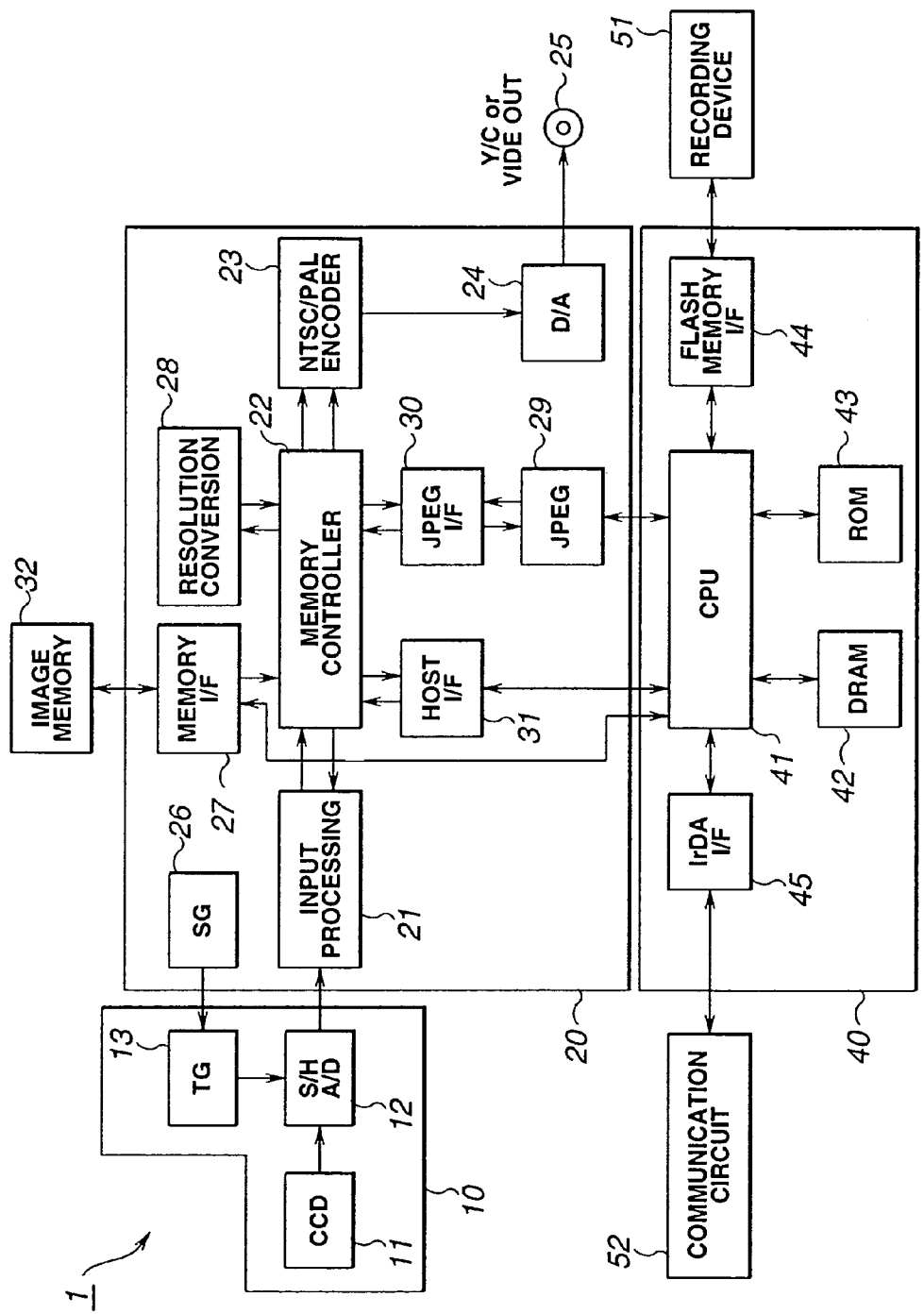
FIG. 2 is a block diagram showing a schematic structure of a digital still camera embodying the present invention.

The present invention is applied to digital still camera 1, configured as shown for example in FIG. 2.

The digital still camera 1 includes an image generating unit 10 for generating image signals, an input signal processor 20 for processing image data in a pre-set fashion, an image memory 32, comprised of an SDRAM, and a controller 40 for controlling the input signal processor 20.

The image generating unit 10 includes a solid-state imaging device for generating image signals, such as a CCD image sensor 11, a sample holding-analog/digital circuit (S/H-A/D circuit 12) for sample-holding and digitizing the image signals to output image data, and a timing generator 13 for generating timing signals. This timing generator 13 generates horizontal synchronization signals and vertical synchronization signals for controlling respective circuits of the image generating unit 10 based on synchronization signals supplied from the signal processor input.

The CCD image sensor 11 generates image data corresponding to XGA (extended graphic array: 1024×768) pixel data made up of, for example, 800,000 pixels. The CCD image sensor 11 is driven based on the synchronization signals from the timing generator 13 to output image signals at a rate of 30 frames per second. Meanwhile, the CCD image sensor 11 has the function of thinning out image signals and is able to thin out vertical components of the image signals to ½, ⅓, ¼, . . . to output the resulting thinned-out signals.

The S/H-A/D circuit 12 is also adapted to perform sample-holding and A/D conversion at a pre-set sampling interval based on the synchronization signals from the timing generator 13 to send the resulting image data to the signal processor 20.

The signal processor 20 includes a sole LSI (large scale integrated circuit). The signal processor 20 includes an input signal processor 21 for input processing and camera processing on image data from the image generating unit 10, a memory controller 22 for controlling the readout/write of image data for the image memory 32, an NTSC/PAL (phase alternation by line) encoder 23, a D/A converter 24 for analogizing image data and outputting the resulting analog signals to outside, and a sync generator 26 for generating synchronization signals and supplying the resulting synchronization signals to the timing generator 13.

The signal processor 20 also includes a memory interface 27, as an interface for the image memory 32, a resolution conversion circuit 28 for converting the resolution of the image data, a JPEG (Joint Photographic Experts Group) encoder/decoder 29, for compressing/expanding image data, a JPEG interface 30, as an interface of the JPEG encoder/decoder 29, and a host interface 31, as an interface for having data transmission/reception with the CPU of the controller 40.

The input signal processor 21 processes the image data from the S/H-A/D circuit 12 with digital clamp, shading correction, aperture correction, gamma correction or color processing and routes the resulting processed signals to the memory controller 22. The input signal processor 21 has the function of processing input data to convert the input data into Y, Cb and Cr. If the resolution of the image data is larger than that of the VGA (Video Graphics Array), the input signal processor 21 is able to perform the processing of lowering the resolution. The input signal processor 21 also performs the auto-focussing and auto-iris detection to route the data to the controller 40 to effect automatic adjustment of the focussing mechanism and the iris mechanism. The input signal processor 21 also detects the signal level of the three prime colors making up the image data to adjust automatic white balance.

The memory controller 22 also performs control to cause image data supplied from the input signal processor 21 or other circuitry to be written in the image memory 32 via a memory interface 27 and to read out image data of the image memory 32 via the memory interface 27. At this time, the memory controller 22 detects whether or not there is any defective pixel in the CCD image sensor 11 based on the image data stored in the image memory 32.

The memory controller 22 routes the image data read out from the image memory 32 to, for example, the NTSC/PAL encoder 23. When fed with the image data from the memory controller 22, the NTSC/PAL encoder 23 encodes the image data in accordance with the NTSC system or the PAL system to send the encoded data to the D/A converter 24. The D/A converter 24 analogizes the image data to output the resulting analog signals via output terminal 25.

The memory controller 22 routes the image data, read out from the memory controller 22, to the resolution conversion circuit 28 to cause the image data to be converted in resolution, while causing the image data outputted by the resolution conversion circuit 28 to be written in the image memory 32.

The memory controller 22 routes the image data via the JPEG interface 30 to the JPEG encoder/decoder 29 to effect compression of the still image, while causing the image data expanded by the JPEG encoder/decoder 29 to be written in the image memory 32.

The image memory 32 not only stores the image data as described above but also stores OSD data (on-screen-display data) as the so-called character generator data. The OSD data is made up of bit map data. The controller 22 controls the readout/write of the OSD data. The image data and the OSD data are synthesized by the NTSC/PAL encoder 23.

The controller 40 includes a CPU (central processing unit) 41 for controlling the respective circuits of the signal processor 20, a DRAM (dynamic random access memory) 42, a ROM (read-only memory) 43, having the control program for the CPU 41 stored therein, a flash memory interface 44, as an interface for exchanging image data with a storage device 51, such as a flash memory, and an IrDA interface 45, as an interface of the communication circuit 52 constituted such as by IrLED.

For example, the CPU 41 causes image data compressed by the JPEG encoder/decoder 29 to be written via a flash memory/interface 44 in a storage device 51, made up of a flash memory, while causing image data to be read out from the storage device 51 to route the image data read out from the JPEG encoder/decoder 29. The CPU 41 also causes the image data read out from the storage device 51 to be outputted via the IrDA interface 45 and the communication circuit 52 as infrared light to outside.

Figure 3:
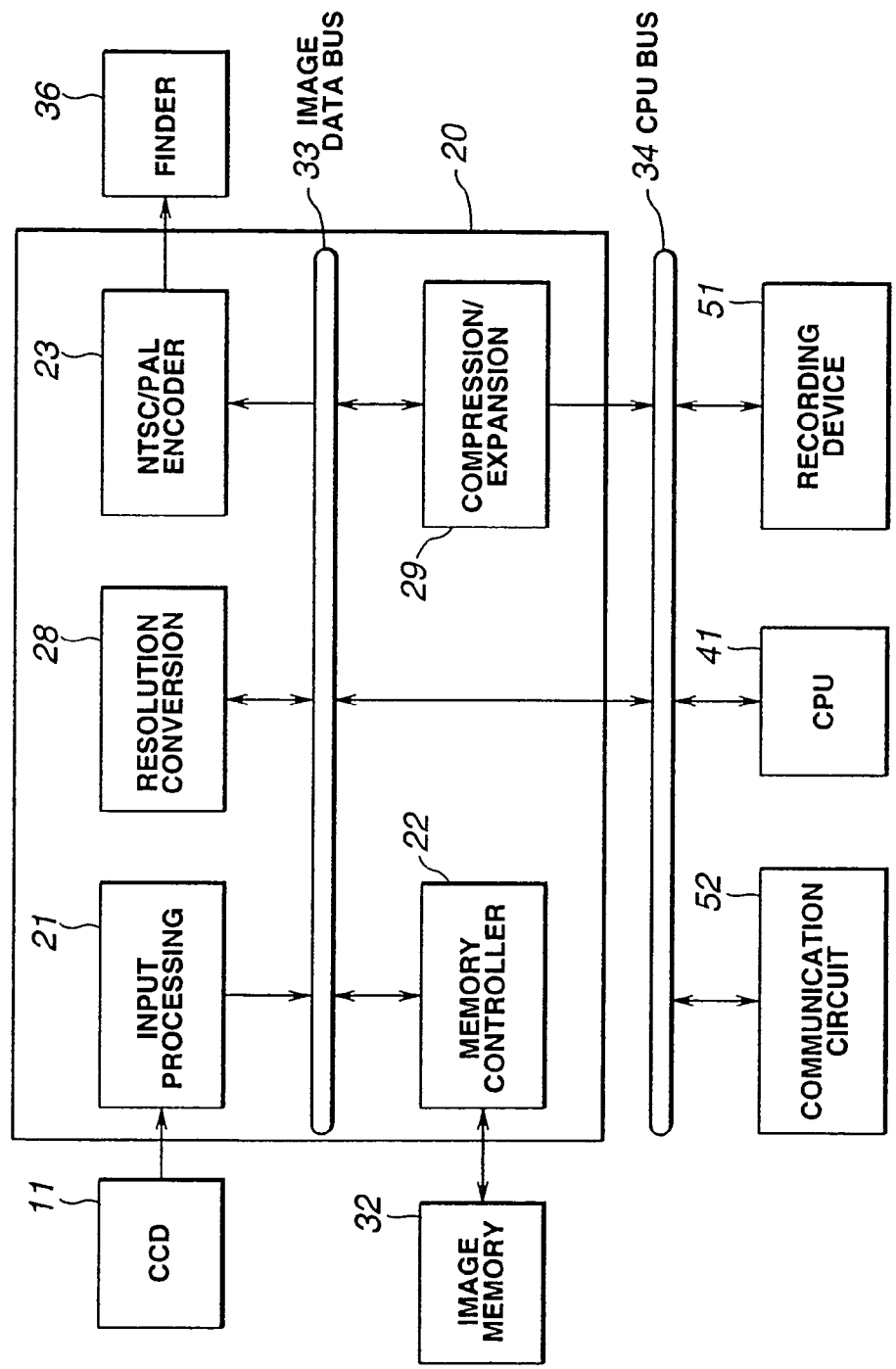
FIG. 3 is a block diagram showing the schematic structure of the digital still camera shown in FIG. 2.

The schematic structure of the digital still camera 1 is shown in FIG. 3.

The input signal processor 21 routes the image data from the CCD image sensor 11 via an image data bus 33 to the image memory 32. The NTSC/PAL encoder 23 encodes the image data from the image memory 32 in a pre-set fashion to send the resulting encoded data to the finder 36. This causes an image of an object to be displayed on the finder 36 which is adapted to display the image in association with the image data up to the VGA format.

The memory controller 22 performs data transfer between the image memory 32 and the signal processing circuits connecting to the image data bus 33. The resolution conversion circuit 28 performs resolution conversion of the image data from the image memory 32 to route the results to the image memory 32. The JPEG encoder/decoder 29 compresses the image data from the image memory 32 in accordance with the JPEG system to route the compressed image data via CPU bus 34 to the CPU 41, which then causes the compressed image data to be written in the storage device 51. The CPU 41 is also able to output the compressed image data via the CPU bus 34 and the communication circuit 52 to outside.

Thus, is FIG. 3, the respective circuits of the signal processor 20 are interconnected over the image data bus 33. The image data bus 33 is a virtual bus and indicates that there is placed a limit to the transfer band for image data exchanged between the respective circuits.

In the signal processor 20, the respective circuits, such as NTSC/PAL encoder 23 or the resolution conversion circuit 28, send to the memory controller 22 a request signal indicating that image data are demanded. These circuits also transmit a request signal to the memory controller 22 when outputting the image data after the end of the processing of the image data.

On reception of the request signals from the respective circuits, the memory controller 22 selects those circuits having the high priority sequence, and transmits an acknowledge signal to the selected circuit. The acknowledge signal indicates that image data can be routed to a circuit receiving the signal or that image data outputted by a circuit which has received the acknowledge signal is ready to be received. The memory controller 22 reads out image data from the image memory 32 to route the read-out image data via image data bus 33 to the circuit corresponding to the destination of the acknowledge signal. The memory controller 22 receives the image data outputted by the circuit which has sent the acknowledge signal to write the image data in the image memory 32.

On reception of the request signals from plural circuits, the memory controller 22 is able to select preferentially the circuit which has to perform the processing in real-time. For example, if an image of an object is to be displayed on the finder 36, the memory controller 22 preferentially selects the input signal processor 21 and the NTSC/PAL encoder 23. It is also possible for the memory controller 22 to decipher the bus occupation ratio of the image data on the image data bus 33 to determine the priority sequence of the respective circuits depending on the occupation ratio.

If image data can be routed to the respective circuits within the transfer band limitation of the image data bus 33, it is possible for the memory controller 22 to perform control to send the acknowledge signal to the respective circuits time-divisionally to permit the respective circuits to perform pre-set processing. This enables the memory controller 22 to have access in real-time to data in the respective circuits to cause the image data from the respective circuits to be written in the image memory 32 or to cause the image data in the image memory 32 to be read out and sent to the respective circuits.

If, when the memory controller 22 has access to external circuitry, not shown, over the image data bus 33, the external circuitry can send the above-mentioned request signal or receive the transmitted acknowledge signal, the memory controller 22 can have access simultaneously and time-divisionally to the respective circuits within the signal processor 20 within the transfer band limitation range of the image data bus 33. That is, if within the range of the band of the image data bus 33, the memory controller 22 can have simultaneous access to the circuits in the signal processor 20 or to the external circuits within the signal processor 20 time-divisionally without regard to the number of the circuits within the signal processor 20 or the external circuit.

As mentioned above, the memory controller 22 performs arbitration of the image data bus 33, write/readout control of image data between the image memory 32 and the respective circuits and data transfer to the CPU bus 34.

Figure 4:
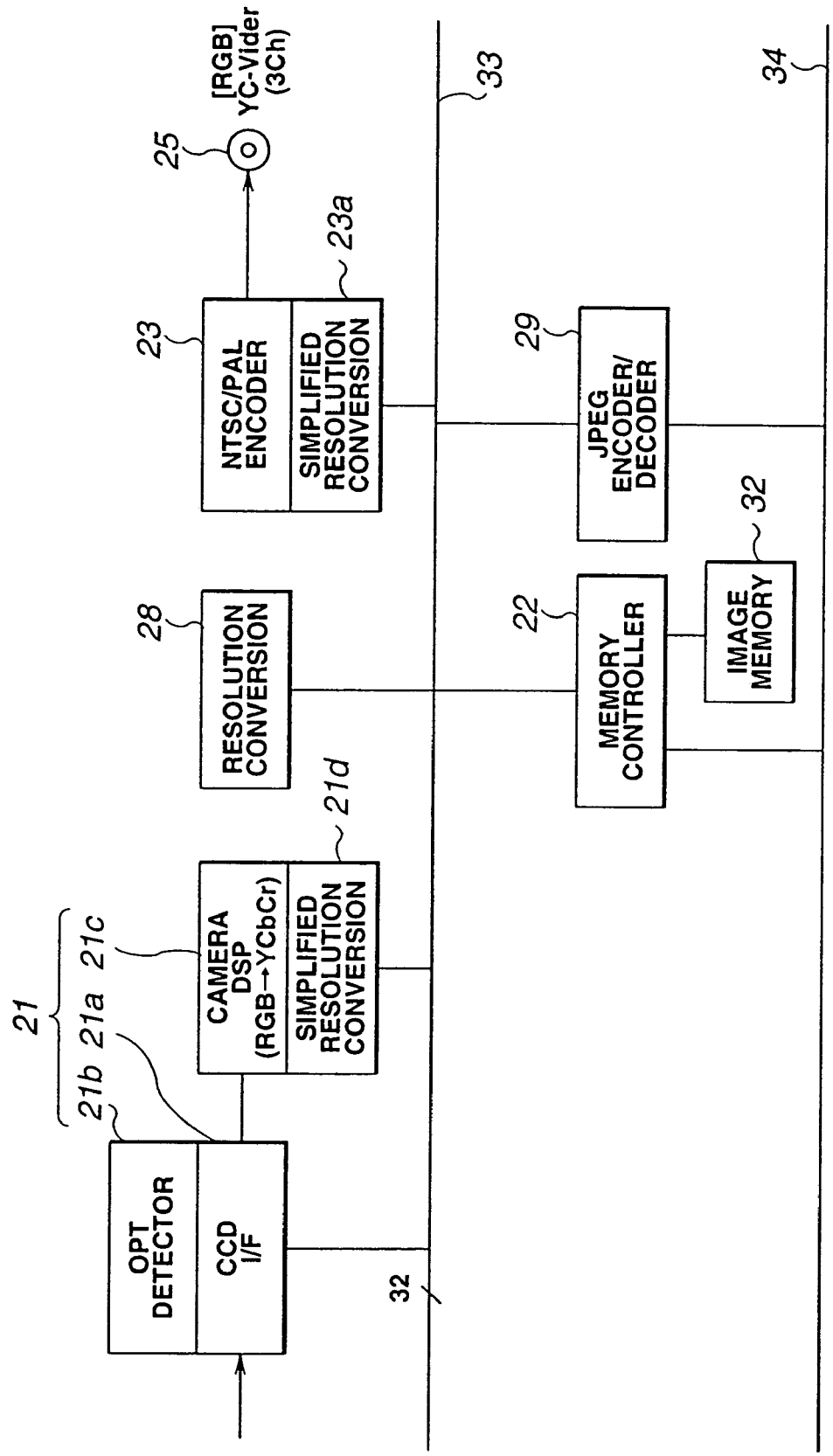
FIG. 4 is a block diagram for illustrating flow of image data in a signal processing unit of the digital still camera shown in FIG. 2.
Figure 5:
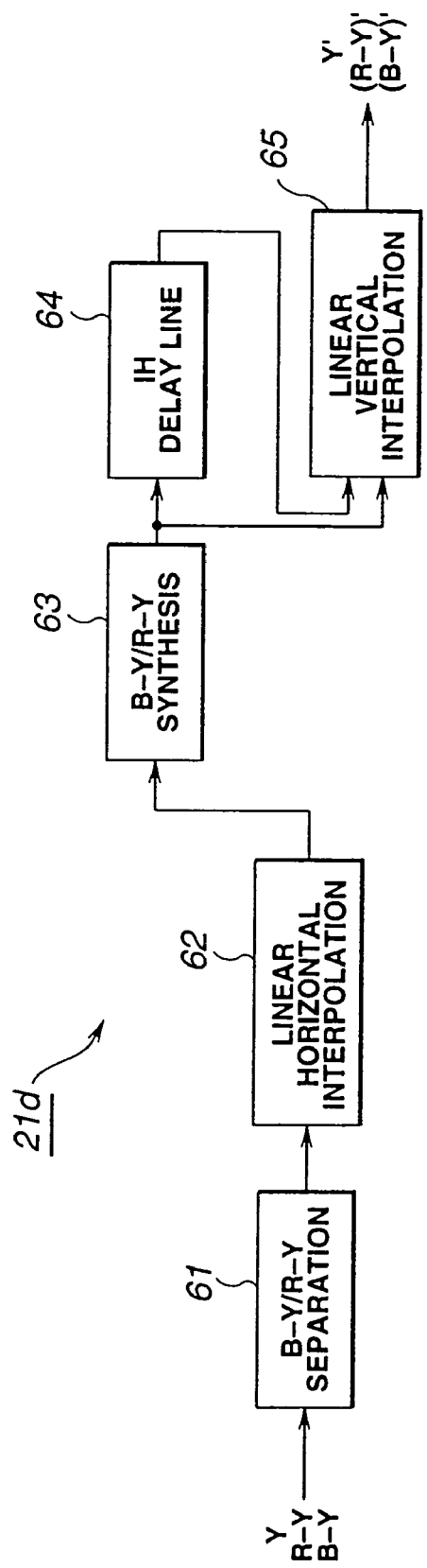
FIG. 5 is a block diagram for illustrating the structure of a simplified resolution conversion circuit in an input processing circuit of the signal processing unit.

The specified flow of image data in the signal processor 20 is explained with reference to FIG. 4.

The input signal processor 21 includes a CCD interface 21a for performing pre-set signal processing on the image data from the image generating unit 10, a detection circuit 21b for processing the CCD interface 21a, and a camera digital signal processor 21c (camera DSP 21c) for doing conversion processing of the image data.

The CCD interface 21a performs the processing, such as the digital clamp, white balance adjustment or gamma correction, on the image data made up of R, G and B from the S/H-A/D circuit 12 shown information FIG. 2, or decimates the components in the horizontal direction of image data in case of necessity. After such processing, the CCD interface 21a routes image data to the camera DSP 21c or to the memory controller 22 via the image data bus 33.

From the image data of the CCD interface 21a, the detection circuit 21b performs detection for auto-focussing, auto-iris or white balance adjustment.

The camera DSP 21c converts the image data of R, G and B from the CCD interface 21a into image data made up of luminance signal Y and chrominance signals Cb, Cr. The camera DSP 21c also has a simplified resolution conversion circuit 21 which not only performs the above processing but also converts the resolution of the image data in a simplified fashion.

The simplified resolution conversion circuit 21d operates for converting the resolution of the image data to lower values if the resolution of the image data generated by the CCD image sensor 11 is larger than, for example, the VGA format.

Specifically, the simplified resolution conversion circuit 21d includes a B—Y/R—Y separation circuit 61, for separating chrominance signals, a horizontal direction linear interpolation circuit 62 for interpolation in the horizontal direction, a B—Y/R—Y synthesis circuit 63 for synthesizing the chrominance signals, a 1H delay circuit 64 for delaying the respective signals by a horizontal scanning period (1H period), and a vertical direction linear interpolation circuit 65.

The B—Y/R—Y separation circuit 61 separates the chrominance signals B—Y and R—Y, as chroma signals Cb, Cr, from the image data from the camera DSP 21c, to route the separated chroma signals to the horizontal direction linear interpolation circuit 62. The horizontal direction linear interpolation circuit 62 interpolates the luminance signals Y and the chrominance signals B—Y, R—Y in the horizontal direction to lower the luminance in the horizontal direction to route the interpolated luminance signals Y and the chrominance signals B—Y, R—Y to the B—Y/R—Y synthesis circuit 63.

The B—Y/R—Y synthesis circuit 63 synthesizes the chrominance signals B—Y, R—Y, to route the luminance signals Y from the horizontal direction linear interpolation circuit 62 and the synthesized chrominance signals B—Y, R—Y to the 1H delay circuit 64 and to the vertical direction linear interpolation circuit 65. The 1H delay circuit 64 delays the luminance signals Y and the chrominance signals by 1H to route the delayed signals to the vertical direction linear interpolation circuit 65. The vertical direction linear interpolation circuit 65 performs linear interpolation processing in the vertical direction, based on the luminance signals Y and the chrominance B—Y, R—Y from the B—Y/R—Y synthesis circuit 63 and the 1H delay circuit 64, to output image data made up of luminance signals Y' and chrominance signals (B—Y)', (R—Y)' lowered in resolution in both the horizontal and vertical directions.

The resolution conversion circuit 28 performs resolution conversion processing of converting [p×q] image data into [m×n] image data. The resolution conversion circuit 28 performs processing for suppressing the resolution to a pre-set value if the image data produced in the CCD image sensor 11 are of high resolution. It is however possible to process the image data of low resolution into data of high resolution.

Figure 6:
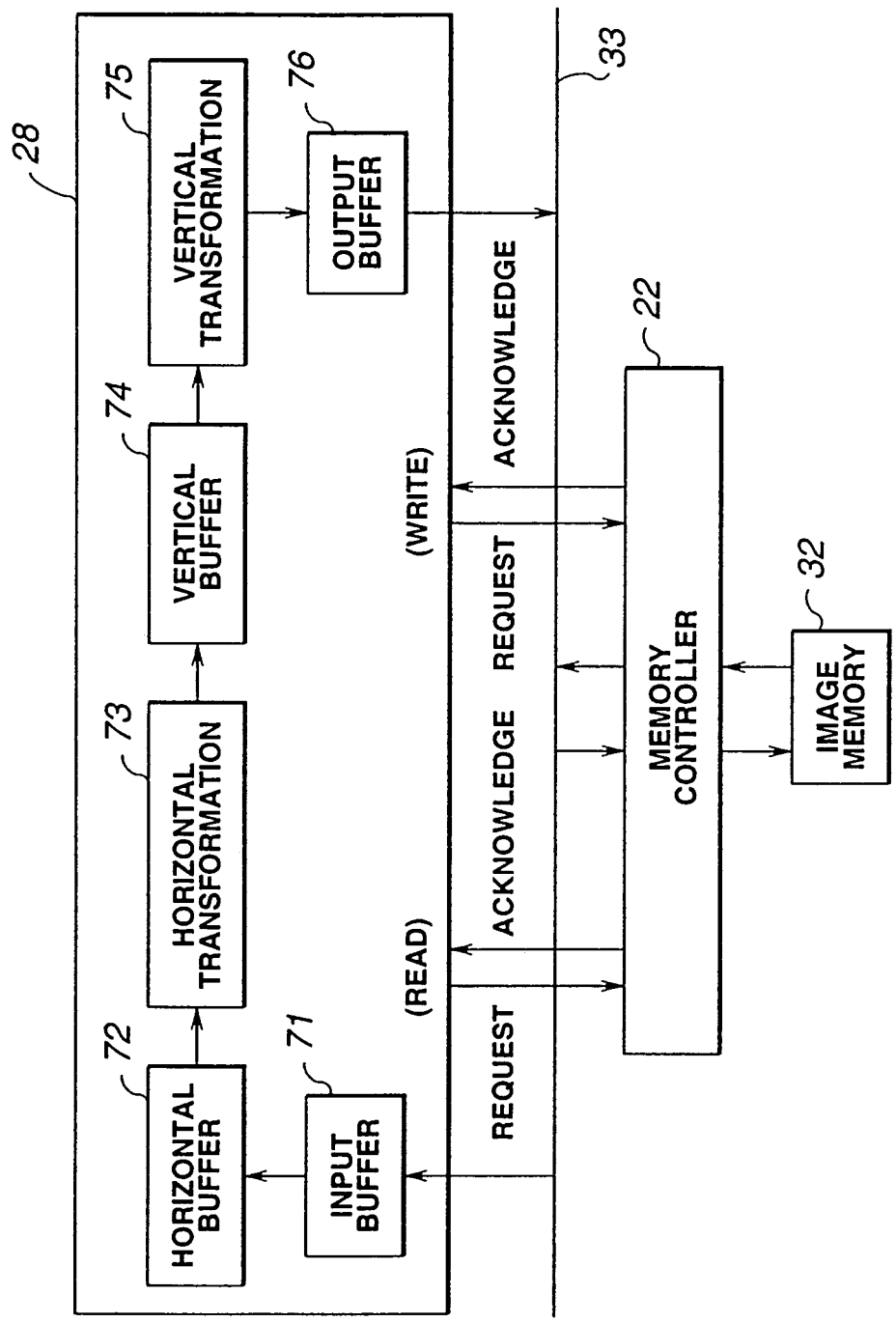
FIG. 6 is a block diagram showing the structure of the resolution conversion circuit of the signal processing unit.

Referring to FIG. 6, the resolution conversion circuit 28 includes an input buffer 71 for storing image data, inputted from the image data bus 33, a horizontal direction buffer 72, for buffering the image data from the an input buffer 71 in the horizontal direction, a horizontal direction transform processing circuit 73 for converting the resolution of the image data from the horizontal direction buffer 72 in the horizontal direction, a vertical direction buffer 74 for buffering the image data from the horizontal direction transform processing circuit 73 in the vertical direction, a vertical direction transform processing circuit 75 for converting the resolution of the image data in the vertical direction, and an output buffer 76 for buffering at the time of outputting.

When ready for converting the resolution of the image data, the resolution conversion circuit 28 outputs a read request signal requesting the memory controller 22 to read out image data from the image memory 32, while outputting a write request signal requesting the memory controller 22 to write the image data in the image memory 32 after the conversion processing of the image data. The resolution conversion circuit 28 also receives an acknowledge signal indicating that the memory controller 22 has responded to the request signal.

Figure 7:
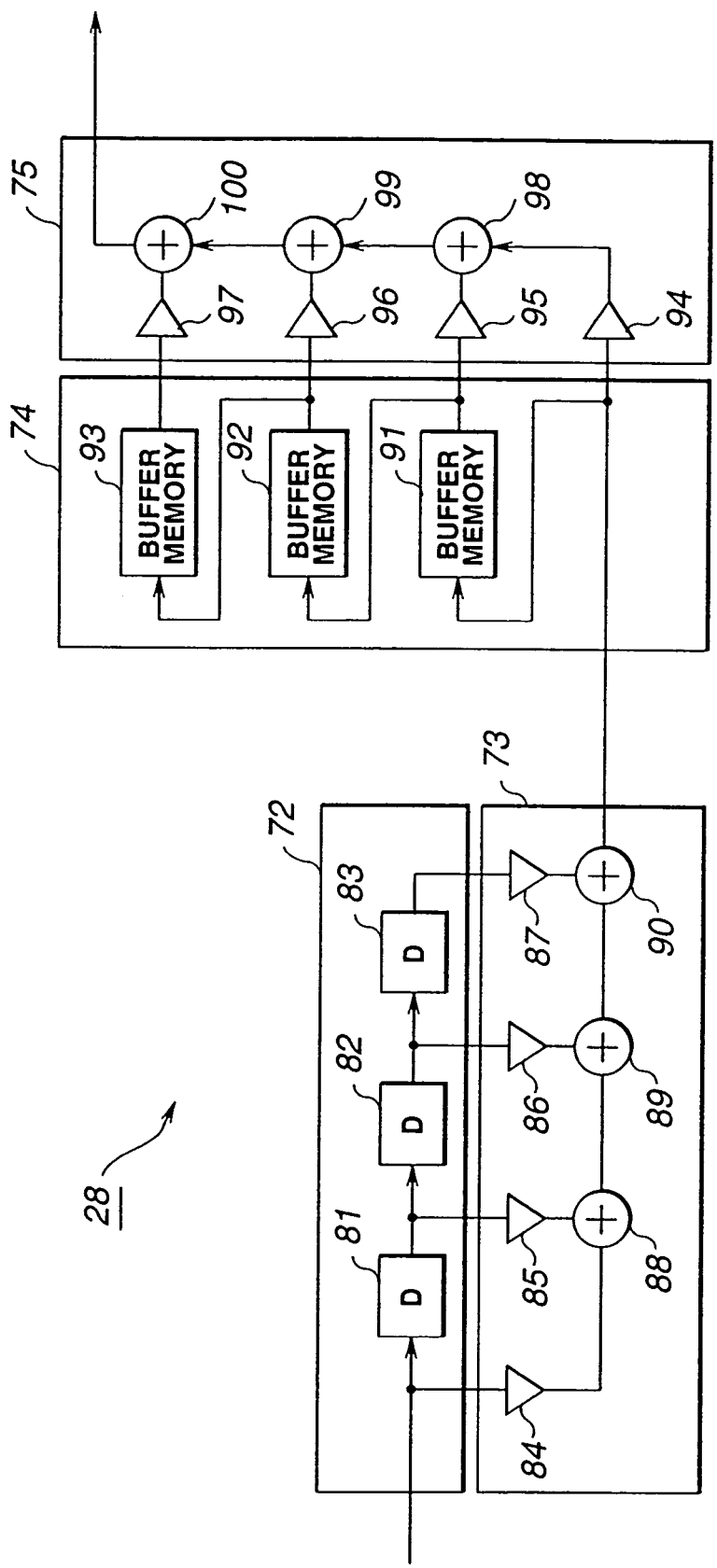
FIG. 7 is a block diagram showing a specified structure of a horizontal direction buffer, a horizontal direction conversion processing circuit, a vertical direction buffer and a vertical direction conversion processing circuit of the resolution conversion circuit.
Figure 8:
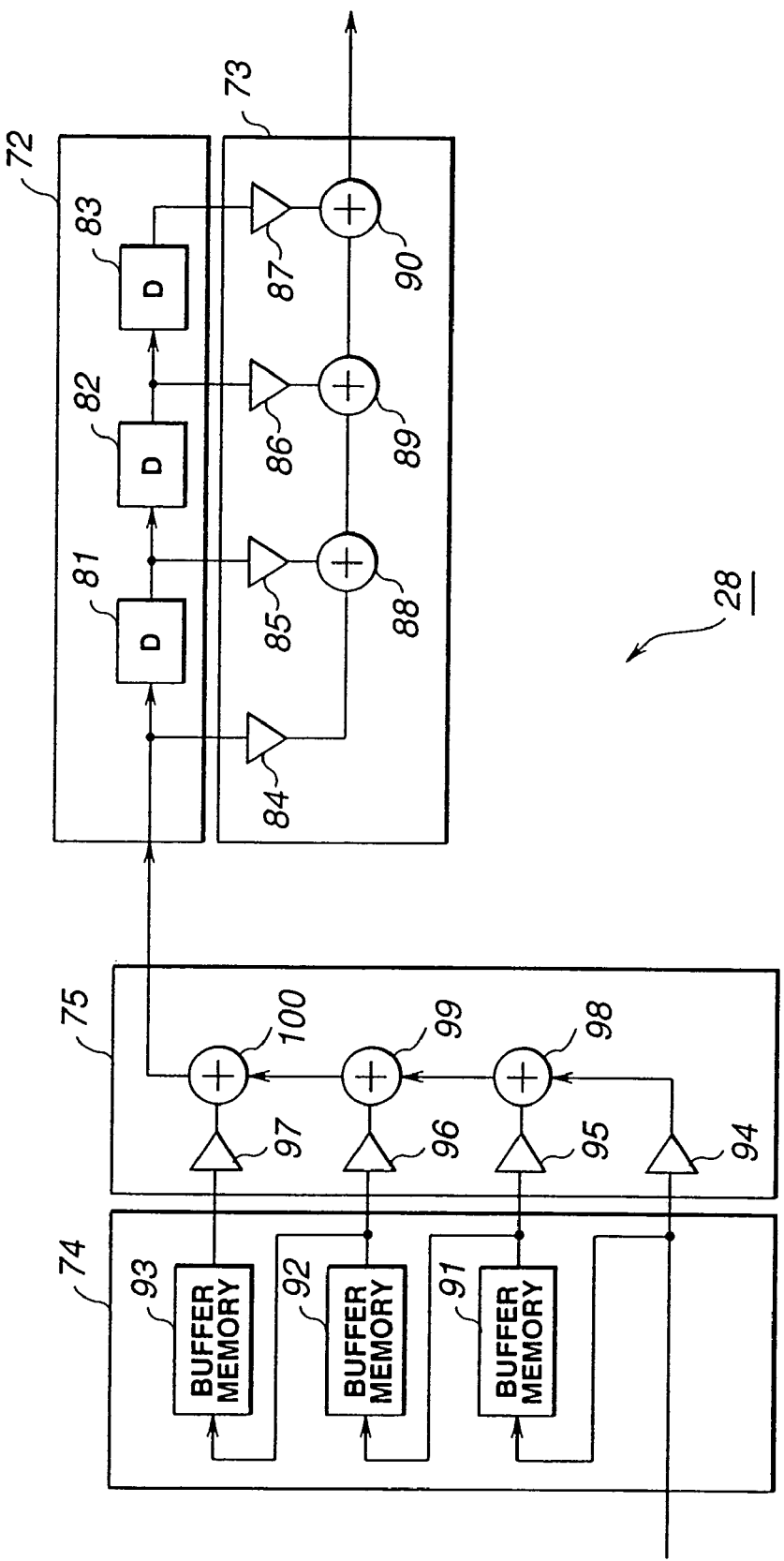
FIG. 8 is a block diagram showing an alternative structure of the resolution conversion circuit.

Referring to FIG. 7, the horizontal direction buffer 72 is made up of a first delay circuit 81, a second delay circuit 82 and a third delay circuit 83 each for producing the delay of one pixel. Thus, the first delay circuit 81 outputs image data delayed by one pixel, while the second and third delay circuits 81, 82 output image data delayed by two pixels and image data delayed by three pixels, respectively.

Referring to FIG. 7, the horizontal direction transform processing circuit 73 includes first to fourth multipliers 84, 85, 86, 87, and first to third adders 88, 89, 90. A circuit for normalizing data is incidentally annexed at back of the adder 90.

The first multiplier 84 multiplies the image data supplied from the an input buffer 71 with a pre-set coefficient to route the resulting data to the adder 88. The second multiplier 85 multiplies the image data supplied from the first delay circuit 81 with a pre-set coefficient to route the resulting data to the adder 88. The third multiplier 86 multiplies the image data supplied from the second delay circuit 82 with a pre-set coefficient to route the resulting data to the adder 89. The fourth multiplier 87 multiplies the image data supplied from the third delay circuit 83 with a pre-set coefficient to route the resulting data to the adder 90. The first adder 88 synthesizes the image data to send the resulting data to the second adder 89. The second adder 89 synthesizes the image data to send the resulting data to the third adder 90. The third adder 90 synthesizes the respective image data to send the resulting data as image data converted in resolution in the horizontal direction to the vertical direction buffer 74.

Thus, the horizontal direction transform processing circuit 73 weights plural image data each having one pixel delay in a pre-set fashion with pre-set weights and synthesizes the weighted image data to interpolate or decimate the pixels in the horizontal direction to convert the resolution in the horizontal direction.

The vertical direction buffer 74 is constituted by a serial connection of first to third buffers 91, 92, 93, each adapted to produce a one-line delay. Thus, the first bufer memory 91 outputs image data delayed by one line, while the second and third buffer memories 92, 93 output the image data delayed by two and three lines, respectively.

Referring to FIG. 7, the vertical direction transform processing circuit 75 includes fifth to eighth multipliers 94 to 97 and fourth to sixth adders 98 to 100. The vertical direction transform processing circuit 75 occasionally includes a circuit for normalizing data on the downstream side of the adder 90.

The fifth multiplier 94 multiplies the image data supplied from the horizontal direction conversion circuit 73 with a pre-set coefficient to route the resulting data to the fourth adder 98. The sixth multiplier 95 multiplies the image data supplied from the first line memory 91 with a pre-set coefficient to route the resulting data to the fourth adder 98. The seventh multiplier 96 multiplies the image data supplied from the second line memory 92 with a pre-set coefficient to route the resulting data to the fifth adder 99. The eighth multiplier 97 multiplies the image data supplied from the third line memory 93 with a pre-set coefficient to route the resulting data to the sixth adder 100. The fourth adder 98 synthesizes the image data to send the resulting data to the fifth adder 99. The fifth adder 99 synthesizes the image data to send the resulting data to the sixth adder 100. The sixth adder 100 synthesizes the respective image data to output the resulting data as image data converted in resolution in the horizontal direction.

Thus, the vertical direction transform processing circuit 75 weights plural image data each having one line delay in a pre-set fashion with pre-set weights and synthesizes the weighted image data to interpolate or decimate the pixels in the horizontal direction to convert the resolution in the vertical direction.

In FIG. 7, the resolution conversion circuit 28 first performs resolution conversion in the horizontal direction followed by resolution conversion in the vertical direction. It is however possible for the resolution conversion circuit 28 to perform resolution conversion in the vertical direction followed by conversion in the horizontal direction. That is, the resolution conversion circuit 28 may be configured to supply the image data from the input buffer 71 to the vertical direction buffer 74 and to effect the processing in the vertical direction buffer 74, vertical direction transform processing circuit 75, horizontal direction buffer 72 and in the horizontal direction transform processing circuit 73, in this order.

Figure 9:
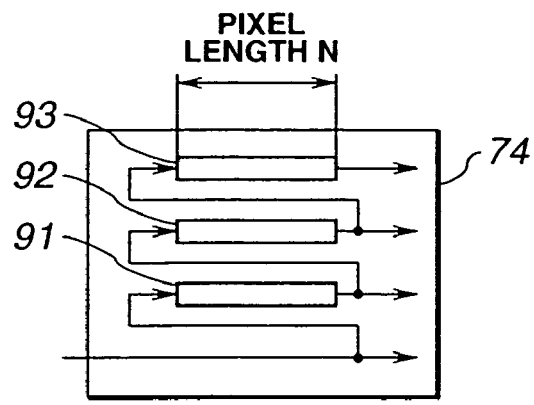
FIG. 9 is a block diagram showing the structure of the vertical direction buffer of the resolution conversion circuit.
Figure 10:
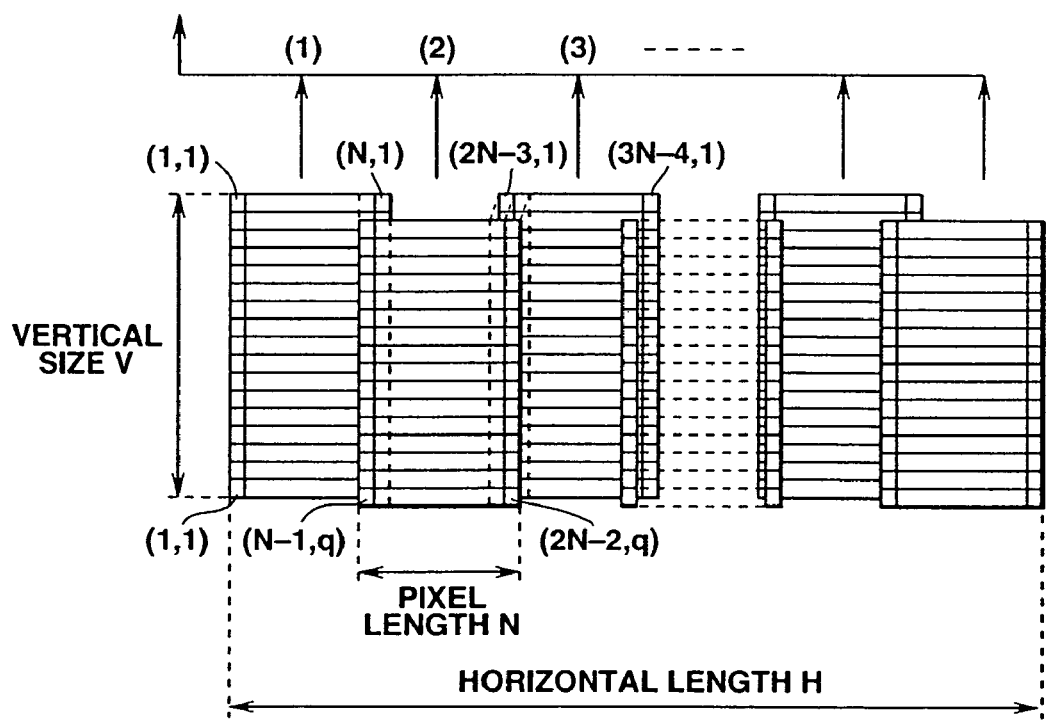
FIG. 10 illustrates a technique for reading out image data from the image memory by the memory controller.

In the above-described embodiment, the first to third buffer memories 91 to 93 in the vertical direction buffer 74 are configured to store one-line (1H) image data. Alternatively, the first to third buffer memories 91 to 93 may be configured for storing image data lesser than one line, as shown in FIG. 9. It is then necessary for the memory controller 22 to read out the image data stored in the image memory 32 every N pixels, as shown in FIG. 10.

Figure 11:
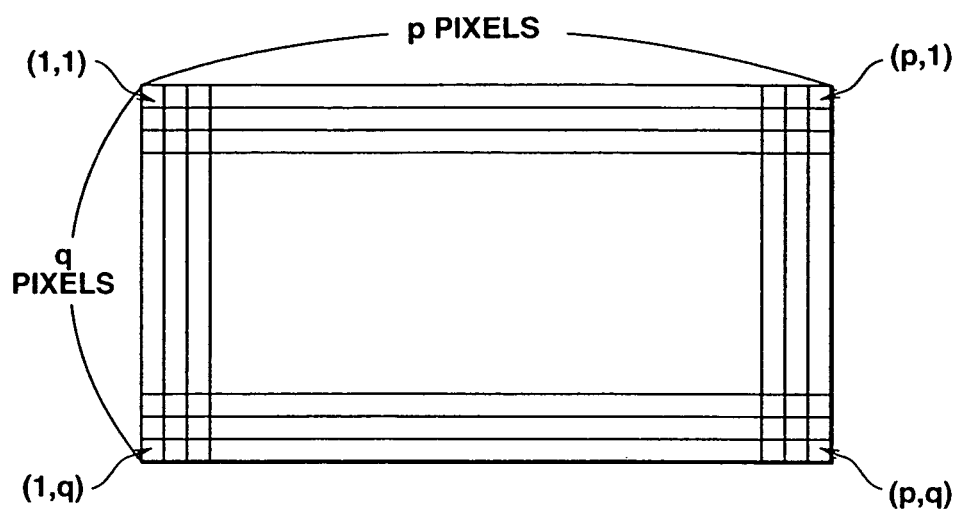
FIG. 11 illustrates the coordinate position of pixels making up an image.

Specifically, the memory controller 22 reads out pixel data corresponding to a viewing screen stored in the image memory 32 every N pixels on the line basis in the vertical direction. Referring to FIG. 11, each viewing screen is made up of p×q pixels, with the coordinate of the upper left pixel being (1,1), that of the upper right pixel being (p,1), that of the lower left pixel being (1,q) and with the lower right pixel being (p,q).

Figure 12:
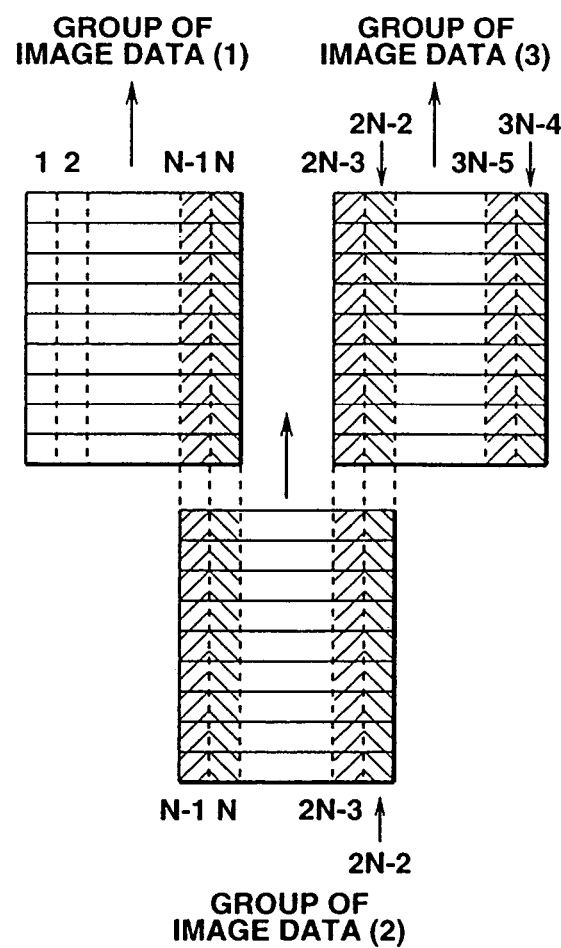
FIG. 12 illustrates another technique for reading out image data from the image memory by the memory controller.

Referring to FIG. 12, the memory controller 22 causes the image data of N pixels to be read out on the line basis in the horizontal direction in the sequence of the rows 1, 2, . . . , q. This causes the memory controller 22 to read out image data corresponding to N pixels from the left end, or N×q pixels, that is pixel data in an area defined by (1,1), (1,q), (N,q) and (N,1). This image data is referred to below as image data set (1).

The memory controller 22 then reads out image data in a range defined by (N−1, 1) (N−1, q), (2N−2, q), (2N−2, 1), referred to below as the image data set (2). If the memory controller 22 reads out the image data set (1) and the image data set (2), it is tantamount to reading out the image data of the (N−1)st column and the Nth column twice.

The reason is that, since the vertical direction transform processing circuit 75 performs interpolation beginning from the surrounding pixel, the pixels stored in the beginning end and the trailing end of the first to third buffer memories 91 to 93 are not the object of processing. For example, if the image data set (1) is read out, the pixel (N, 1) is not the object of the interpolation processing in the vertical direction. However, this pixel (N, 1) is read out when the pixel data set (2) is read out, and becomes the object of interpolation processing.

In similar manner, the memory controller 22 reads out image data of N pixels in the horizontal direction every line so that image data of the last two columns of the directly previous image data set will be included. This routes the image data set to the resolution conversion circuit 28.

The vertical direction buffer 74 is fed with image data, in an amount corresponding to the capacity of the first to third buffers 91 to 93, on the line basis. Thus, image data offset one line is stored in each f the first to third buffer memories 91 to 93. The vertical direction transform processing circuit 75 is able to perform the resolution conversion processing in the vertical direction based on the image data from the first to third buffers 91 to 93 of the vertical direction buffer 74.

With the memory controller 22, the memory controller 22 can cause the resolution conversion circuit 28 to execute the resolution conversion in the vertical direction, by readout in meeting with the capacity of the buffer memory, even if the capacity of the buffer memory required for resolution conversion in the vertical direction is not up to one line.

Although the read-out overlap between the image data sets is two columns, it is probable that the overlap exceeds two columns or there is no overlap. It is noted that the present invention is applicable to image signal processing, such as camera signal processing, without limitation to resolution conversion.

Although the foregoing description is directed to the embodiment in which the buffer memory is being used for interpolation for the vertical direction, the present invention is also applicable to an embodiment in which the buffer memory is being used for interpolation for the horizontal direction.

Figure 13:
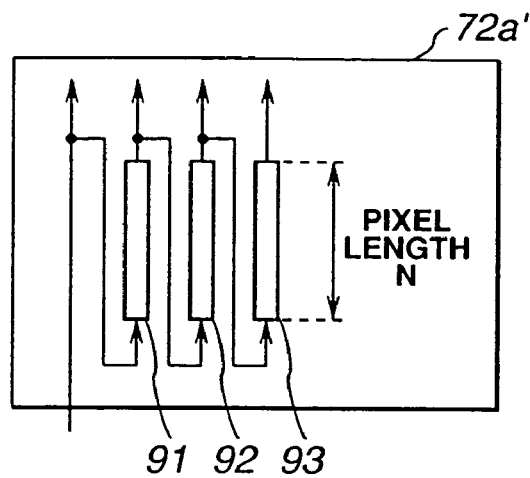
FIG. 13 is a block diagram showing the structure of the horizontal direction buffer of the resolution conversion c constituted by a line buffer.
Figure 14:
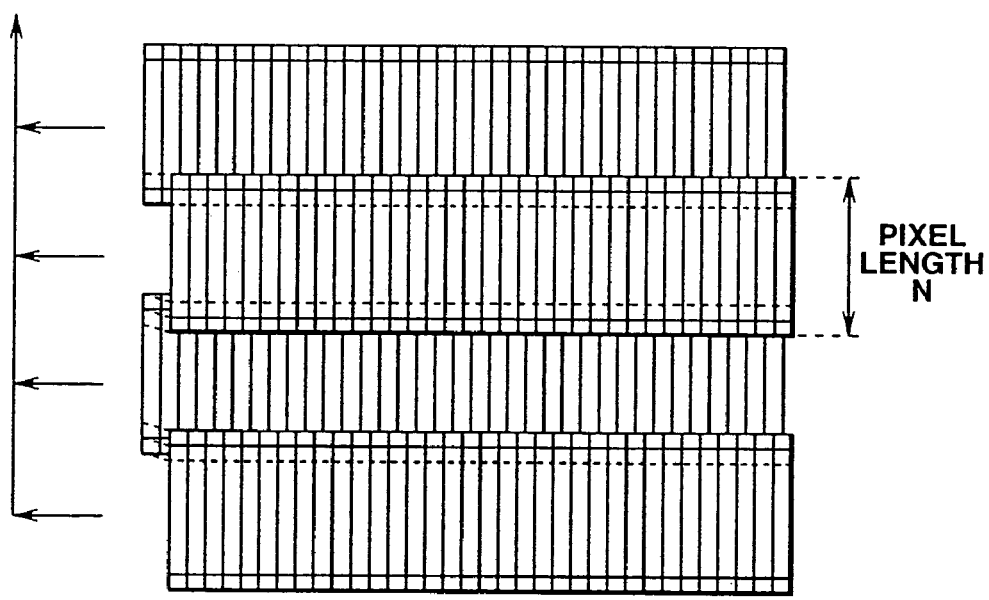
FIG. 14 illustrates the technique when the memory controller reads out image data from the image memory.

That is, the resolution conversion circuit 28 may perform resolution conversion in the horizontal direction using a horizontal direction buffer 72a comprised of a buffer memory 72a having a capacity of N pixels, as shown in FIG. 13. The memory controller 22 can read out image data of N pixels on the column basis in the sequence of the rows 1, 2, . . . , p in the vertical direction, as shown in FIG. 14. Meanwhile, it is necessary for the memory controller 22 to read out the image data stored at the leading and trailing ends of the buffer memory twice, as in the above-described vertical interpolation processing, so that these image data will be the object of the horizontal interpolation processing.

Thus, the memory controller 22 is able to read out image data from the image memory 32 so that resolution conversion processing in the horizontal and vertical directions will be effected for the first to third buffer memories 91 to 93 each having a capacity of N pixels. This enables the circuit scale of the horizontal direction buffer 72 and the vertical direction buffer 74 to be reduced to lower the production cost.

The NTSC/PAL encoder 23, executing the encoding as described above, also has a simplified resolution conversion circuit 23a for increasing the resolution of the image data, if need be, before proceeding to encoding.

The simplified resolution conversion circuit 23a performs resolution conversion for matching to the display standard of the finder 36 if the image data on the image memory 32 is lower than the resolution required for display.

Figure 15:
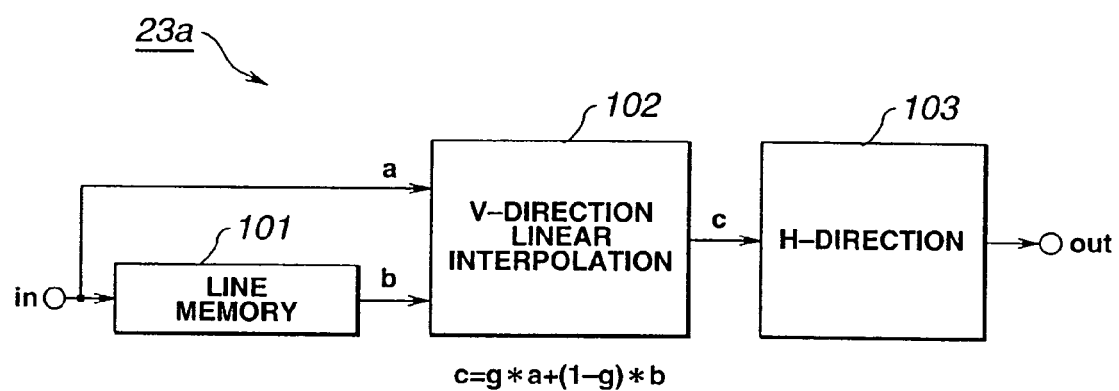
FIG. 15 is a block diagram showing the structure of the simplified resolution conversion circuit in the NTSC/PAL encoder of the signal processing unit.

Referring to FIG. 15, the simplified resolution conversion circuit 23a includes a line memory 101 for storing image data from the image data bus 33, a vertical direction linear interpolation circuit (V-direction linear interpolation circuit 102) for interpolating image data in the vertical direction, and a horizontal direction interpolation circuit 103.

The line memory 101 stores image data from an input terminal in in an amount corresponding to one line to send the image data to the V-direction linear interpolation circuit 102 in the order it is stored. The V-direction linear interpolation circuit 102 weights the image data from the input terminal in and the image data from the V-direction linear interpolation circuit 102 with a pre-set weighting to perform linear interpolation in the vertical direction. The horizontal direction interpolation circuit 103 interpolates Y with an order-seven filter, while interpolating Cb and Cr with an order-three filter. This is simply the interpolation for increasing the resolution by a factor of two. The horizontal direction interpolation circuit 103 outputs the image data at an output terminal out.

For example, if image data inputted from the input terminal in is denoted a, image data read out from the line memory 101 is b, a coefficient for weighting is g, where $0 \leq g \leq 1$, and image data outputted by the V-direction linear interpolation circuit 102 is c, the V-direction linear interpolation circuit 102 effectuates the following processing:

$$c = g*a + (1-g)*b$$

The image data outputted by the output terminal out is encoded by the NTSC/PAL encoder 23, as mentioned previously.

In the signal processing system, the digital still camera 1 is made up of so-called two chips, namely s signal processor 20 and a CPU 41. Therefore, the respective signal processing circuits are each of the chip configuration, so that the substrate surface area and further the power consumption can be made smaller than if the respective signal processing circuits are of separate chip configurations.

Also, since the signal processor 20 is not of the chip configuration inclusive of the CPU, signal processing can be adaptively effectuated even if the application in connection with the CPU 41 is changed. That is, if the signal processor 20 is of the chip configuration inclusive of the CPU, it is impossible to reconstruct the chip in case the application of the CPU is changed. However, the signal processor 20 can perform the pre-set signal processing using a CPU of an optimum structure on the application basis.

The digital still camera 1 of the above-described structure has a finder mode for confirming the status or the position of an object prior to image shooting, a recording mode for shooting the image of the object as confirmed, and a reproducing mode for confirming the shot state of the object image, and effects the processing depending on the prevailing mode.

In the finder mode, the user has to observe the state of the object indicated on the finder 36 before thrusting a shutter button, not shown, to shoot the object. In this finder mode, the memory controller 22 and other circuits are controlled in the following manner. For illustrating the respective modes, reference is had mainly to FIG. 4 and occasionally to FIG. 16.

In the finder mode, the CCD image sensor 11 generates image signals, thinned out to one-third from the vertical components, and furnishes the digitized image data via the S/H-A/D circuit 12 to the CCD interface 21a.

The CCD interface 21a performs signal processing in synchronism with clocks shown in FIG. 16A. Specifically, the CCD interface 21a decimates the horizontal components of the image data supplied by the image generating unit 10 to one-third and corrects the decimated image data for gamma to send the gamma-corrected data to the camera DSP 21c. The CCD interface 21a furnishes the image data converted to 340×256 from the ⅓ decimation process to the camera DSP 21c.

The camera DSP 21c performs data conversion processing on the decimated image data into YCrCb image data. The camera DSP 21c converts the resolution of the image data in the simplified resolution conversion circuit 21d (340×256→320×240) for lowering the resolution of the image data to route the converted image data via image data bus 33 to the memory controller 22.

It is noted that the simplified resolution conversion circuit 21d lowers the resolution in a simplified fashion to an extent necessary for subsequent processing. In this manner, if image data generated by the CCD image sensor 11 is of high resolution, the transfer range taken up by the image data generated by the CCD image sensor 11 can be decreased to evade the stagnancy on the image data bus 33 to maintain the real-time characteristics of the finder mode.

The memory controller 22 writes the image data in the image memory 32, while reading out the image data from the image memory 32 as shown in FIG. 16D to send the read-out image data via the image data bus 33 to the NTSC/PAL encoder 23. Simultaneously, the memory controller 22 reads out the OSD data stored in the image memory 32, as shown in FIG. 16E, to send the OSD data stored in the image memory 32, as shown in FIG. 16E. FIG. 16F shows the state of transfer on the image data bus 33 which enables the above-described real-time processing.

The NTSC/PAL encoder 23 performs resolution conversion of 320×240→640×240 or 320×240→640×288 in the case of the NTSC system or the PAL system, respectively, to send the converted image data to the NTSC/PAL encoder 23. The NTSC/PAL encoder 23 also converts the image data into data of the NTSC system or the PAL system into OSD data which is routed to the finder 36 shown in FIG. 3. This allows the image of the object and the title information etc to be displayed in-real time on the finder 36.

Meanwhile, the NTSC/PAL encoder 23 converts the resolution so that data with low resolution will be increased in resolution, such that, if 320×200 image data is furnished, it is converted into 640×240 image data and into 640×288 image data for the NTSC system and for the PAL system, respectively.

In the digital still camera 1, the resolution of the image data generated by the CCD image sensor 11 is lowered in a simplified fashion in the finder mode to reduce the data volume, so that the image data will be within the bandwidth limitation of the image data bus 33 and so that the resolution will be increased at an output stage to the extent that is necessary for display, at a timing shown in FIG. 16F.

Thus, with the digital still camera 1, the image data is held in the bandwidth limitation of the image data bus 33 to permit the image of the object to be displayed on the finder 36, even if the image data is of high resolution, without the necessity of performing the time-consuming decimation processing.

If the circuitry for preferential processing, namely the CCD interface 21a, camera DSP 21c or the NTSC/PAL encoder 23, is previously set in the CPU 41, and signal processing is carried out time-divisionally in other circuits as in the above circuits, the processing of the respective circuits with high priority may be preferentially performed depending on the data volume of the image data.

In the event of the large data volume of the image data in the simplified resolution conversion circuit 21d, data processing may be performed at a high processing speed, in order to give priority to real-time processing, even though the picture quality is degraded to a certain extent, under control by the CPU 41. In this manner, high-speed processing can be effected in the finder mode even in case of the large data volume of the image data generated in the image generating unit 10.

In the case of the digital still camera 1, having an electronic zooming function, the CPU 41 can control the respective circuits in the following manner.

The memory controller 22 causes the image data, supplied via the CCD interface 21a and camera DSP 21c, to be written in the image memory 32, while causing the image data to be read out from the image memory 32 and routed to the resolution conversion circuit 28. The resolution conversion circuit 28 formulates image data enlarged from a portion of the input image, by an electronic zooming function, to output the resulting image data to the image memory 32. This image data is read out from the image memory 32 and outputted to the finder 36 via the NTSC/PAL encoder 23. This generates electronically zoomed image data.

Since the finder mode gives utmost priority to the real-time characteristics, time-consuming processing is not executed by the respective circuits. However, the CPU 41 can be configured to cause the memory controller 22 and other circuits to perform various processing operations if within the range allowed by the transfer area of the image data bus 33.

For example, the memory controller 22 may be configured to read out image data from the image memory 32, in which is stored the image data furnished from the CCD interface 21a, and to furnish the read-out image data to the NTSC/PAL encoder 23 over the image data bus 33 and to the JPEG encoder/decoder 29. The finder 36 displays the image of the object in rea-time, while the JPEG encoder/decoder 29 compresses the image data in accordance with the JPEG system.

The JPEG encoder/decoder 29 compresses/expands the still image, while it cannot process high-pixel image in real-time. It is thus possible for the JPEG encoder/decoder 29 to decimate a pre-set number of frames of the image data supplied from the image data bus 33 (number of frames or fields) by way of compression or to slice a portion of the image to lower the resolution by way of compression. This enables shooting of a frame-decimated still image continuously or shooting of a low-resolution image continuously.

The user observes the state of the object displayed on the finder 36 in the above-mentioned finder mode. If the object is decided to be shot, the user pushes a shutter button, not shown.

If the shutter button is pushed, the digital still camera 1 proceeds to the recording mode. In the recording mode, the CPU 41 controls the memory controller 22 or the respective circuits in the following manner to record the image of the as-shot object on a recording device 51.

The CCD image sensor 11 halts the decimation operation in synchronism with the thrusting the shutter button to generate image signals of the XGA format to route the digitized image data via the S/H-A/D circuit 12 to the CCD interface 21a.

The CCD interface 21a routes the image data furnished from the S/H-A/D circuit 12 not to the camera DSP 21c, but to the memory controller 22 via the image data bus 33. The memory controller 22 first writes the image data in the image memory 32 and subsequently reads out the image data to route the read-out image data via the image data bus 33 to the camera DSP 21c. The camera DSP 21c converts the image data made up of RGB into image data made up of Y, Cb and Cr.

The camera DSP 21c is fed with image data once written in the image memory 32. That is, the camera DSP 21c effects data conversion on the image data from the image memory 32 instead of on the image data directly supplied from the CCD interface 21a. Thus, it is unnecessary for the camera DSP 21c to perform high-speed data conversion, but it is only sufficient if the camera DSP 21c executes such processing when the image data bus 33 is not busy. Stated differently, it is unnecessary for the camera DSP 21c to perform the processing in real-time, so that data conversion processing can be executed with priority given to the high picture quality rather than to the high processing speed and the resulting converted image data may be routed to the memory controller 22 via the image data bus 33. The memory controller 22 causes the image data to be written in the image memory 32.

The memory controller 22 causes the image data to be read out from the image memory 32 to route the read-out image data to the JPEG encoder/decoder 29. The JPEG encoder/decoder 29 compresses the image data in accordance with the JPEG system to write the compressed image data in the recording device 51 shown in FIG. 3.

If real-time processing is not unnecessary, as during recording, the CPU 41 permits the pre-set processing to be executed after writing the image data transiently in the image memory 32 to exploit the transfer band of the image data bus 33 to process the high-pixel image.

The CPU 41 records the image data of the XGA format directly in the recording device 51 in the recording mode. It is however possible for the resolution conversion circuit 28 to convert the resolution of the image data before recording the image data on the recording device 51. Specifically, it is possible to cause the resolution conversion circuit 28 to convert the resolution of the image data read out from the image memory 32 via the memory controller 22 in meeting with the VGA (1024×768→640×480) to permit the JPEG encoder/decoder 29 to compress the image data to record the compressed data in the recording device 51.

If desirous to confirm the as-shot image after image shooting, the operator thrusts the playback button, not shown, for reproducing the as-shot image.

If the reproducing button is thrust, the digital still camera 1 moves to the reproducing mode. In the reproducing mode, the CPU 41 controls the respective circuits in the following manner to read out the image data of the object.

That is, on detecting the thrusting the reproducing button, the CPU 41 reads out the image data from the recording device 51 and transiently stores the read-out image data in the DRAM 42 before routing the data via CPU bus 34 to the JPEG encoder/decoder 29. The JPEG encoder/decoder 29 expands the image data read out from the recording device 51 in accordance with the JPEG system to produce image data of the XGA format to route the resulting image data via the image data bus 33 to the memory controller 22.

The memory controller 22 writes the image data on the image memory 32 and reds out the image data from the image memory 32 to send the read-out image data via the image data bus 33 to the resolution conversion circuit 28.

The resolution conversion circuit 28 effects resolution conversion so that the image data will be in meeting with the VGA format (1024×768→640×480 in the NTSC system and 1024×768→640×576 in the PAL system) to route the converted image data over the image data bus 33 to the memory controller 22. The image data then is read from the image memory 32 and routed via the NTSC/PAL encoder 23 to the finder 36. This displays an image corresponding to the image data recorded in the recording device 51 on the finder 36.

That is, since the image data recorded in the recording device 51 has high resolution, the CPU 41 first lowers the resolution and subsequently routes the image data to the finder 36.

It is also possible for the CPU 41 to set, for each of the finder mode, recording mode and the reproducing mode, the order of priority of the circuits to be processed in preference and to cause the pertinent circuit to execute the processing in accordance with the order of priority on movement to one of the modes. This enables the signal processing of image data to be executed efficiently depending on the processing contents in each mode.

In the above-described embodiment, it is assumed that the data being processed is the image data equivalent to XGA. It is to be noted that the present invention is not limited to this embodiment and can be applied to, for example, the processing of image data comprised of one million or more pixels.

What is claimed is:

1. Imaging apparatus having an imaging unit for generating image data in response to image light received from an object and an output unit for outputting image data to a display, the imaging apparatus comprising:
    a first resolution converter for decreasing a resolution of image data generated by the imaging unit,
    a second resolution converter for increasing a resolution of image data that is to be outputted to the display via the output unit, and
    a compression unit for compressing image data with a resolution that is decreased by the first resolution converter.

2. The imaging apparatus according to claim 1, further comprising:
    a display unit for displaying an image based on the image data from the output unit, and
    an image data recording unit for writing on a recording medium the image data compressed by the compression unit.

3. The imaging apparatus according to claim 1, further comprising:
    an image data output unit for outputting to outside the image data compressed by the compression unit.

4. Imaging apparatus having an imaging unit for generating image data in response to image light received from an object and an output unit for outputting image data to a display, the imaging apparatus comprising:
    a first resolution converter for decreasing a resolution of image data generated by the imaging unit, and
    a second resolution converter for increasing a resolution of image data that is to be outputted to the display via the output unit, wherein
    the second resolution converter performs a resolution conversion to increase the resolution of the image data if the resolution of that image data before resolution conversion thereof is less than a resolution that matches a resolution standard of the display.

5. The imaging apparatus according to claim 4, further comprising:
    a display unit for displaying an image based on the image data from the output unit.

* * * * *